United States Patent
Berglund et al.

(10) Patent No.: US 10,778,834 B2
(45) Date of Patent: Sep. 15, 2020

(54) CONTROLLING DIFFERENT STATES OF OPERATION OF AN ELECTRONIC DEVICE OVER A COMMUNICATION NETWORK USING A CONTROL DEVICE

(71) Applicant: AXIS AB, Lund (SE)

(72) Inventors: Björn Berglund, Lund (SE); Joacim Tullberg, Lund (SE); Sebastian Hultqvist, Lund (SE); Jonas Nilsson, Lund (SE)

(73) Assignee: Axis AB, Lund (SE)

( * ) Notice: Subject to any disclaimer, the term of this patent is extended or adjusted under 35 U.S.C. 154(b) by 24 days.

(21) Appl. No.: 15/849,305

(22) Filed: Dec. 20, 2017

(65) Prior Publication Data

US 2018/0176359 A1    Jun. 21, 2018

(30) Foreign Application Priority Data

Dec. 20, 2016  (EP) .................................... 16205215

(51) Int. Cl.
*H04N 5/232*   (2006.01)
*H04M 1/725*   (2006.01)
(Continued)

(52) U.S. Cl.
CPC ...... *H04M 1/7258* (2013.01); *G06F 15/0208* (2013.01); *G08B 13/1968* (2013.01);
(Continued)

(58) Field of Classification Search
CPC ...................................................... H04N 5/232
(Continued)

(56) References Cited

U.S. PATENT DOCUMENTS 6,208,379 B1   3/2001   Oya et al.
7,428,314 B2   9/2008   Henson
(Continued)

FOREIGN PATENT DOCUMENTS

JP    2010-141748 A    6/2010
WO   2009/146860 A1   12/2009
WO   2015/153990 A1   10/2015

OTHER PUBLICATIONS

EP 16 20 5215.3 European Search Report (dated Jun. 6, 2017).
Japanese Office Action dated Jun. 4, 2019 for the Japanese Patent Application No. 2017-234835.

*Primary Examiner* — Usman A Khan
(74) *Attorney, Agent, or Firm* — Volpe and Koenig, P.C.

(57) ABSTRACT

A control device for controlling an electronic device over a communication network; the electronic device comprises data storage having control parameters and associated access levels which control operation of the electronic device; circuitry which generates a control setup message including the control parameters and access levels; and a network interface for sending the control setup message. The control device comprises: circuitry for determining an access level of a user logged in to the control device; a network interface for receiving the control setup message; control interface setup circuitry for generating a set of control parameters, extract control parameters having an access level equal to or lower than the access level of the user logged in to the control device; and a graphic generating circuitry for generating a graphical control interface comprising control graphics enabling control of different states of operation of the electronic device corresponding to the extracted control parameters.

15 Claims, 4 Drawing Sheets

(51) Int. Cl.
  *G08B 13/196* (2006.01)
  *G06F 15/02* (2006.01)
  *H04L 29/08* (2006.01)
  *H04L 12/26* (2006.01)
  *G06F 11/32* (2006.01)
  *G03G 15/00* (2006.01)

(52) U.S. Cl.
  CPC ...... *G08B 13/19686* (2013.01); *H04L 43/045* (2013.01); *H04L 67/125* (2013.01); *H04N 5/232* (2013.01); *G03G 15/502* (2013.01); *G06F 11/32* (2013.01)

(58) Field of Classification Search
  USPC .................................................. 348/211.11
  See application file for complete search history.

(56) References Cited

U.S. PATENT DOCUMENTS

| | | | |
|---|---|---|---|
| 2002/0018123 A1* | 2/2002 | Suzuki | H04N 7/142 348/211.99 |
| 2002/0120696 A1 | 8/2002 | Mousseau et al. | |
| 2009/0096877 A1* | 4/2009 | Kunishige | G03B 17/14 348/207.11 |
| 2011/0145574 A1* | 6/2011 | Ju | H04N 7/181 713/166 |
| 2014/0365937 A1* | 12/2014 | Brusilovsky | G06F 3/04847 715/771 |

\* cited by examiner

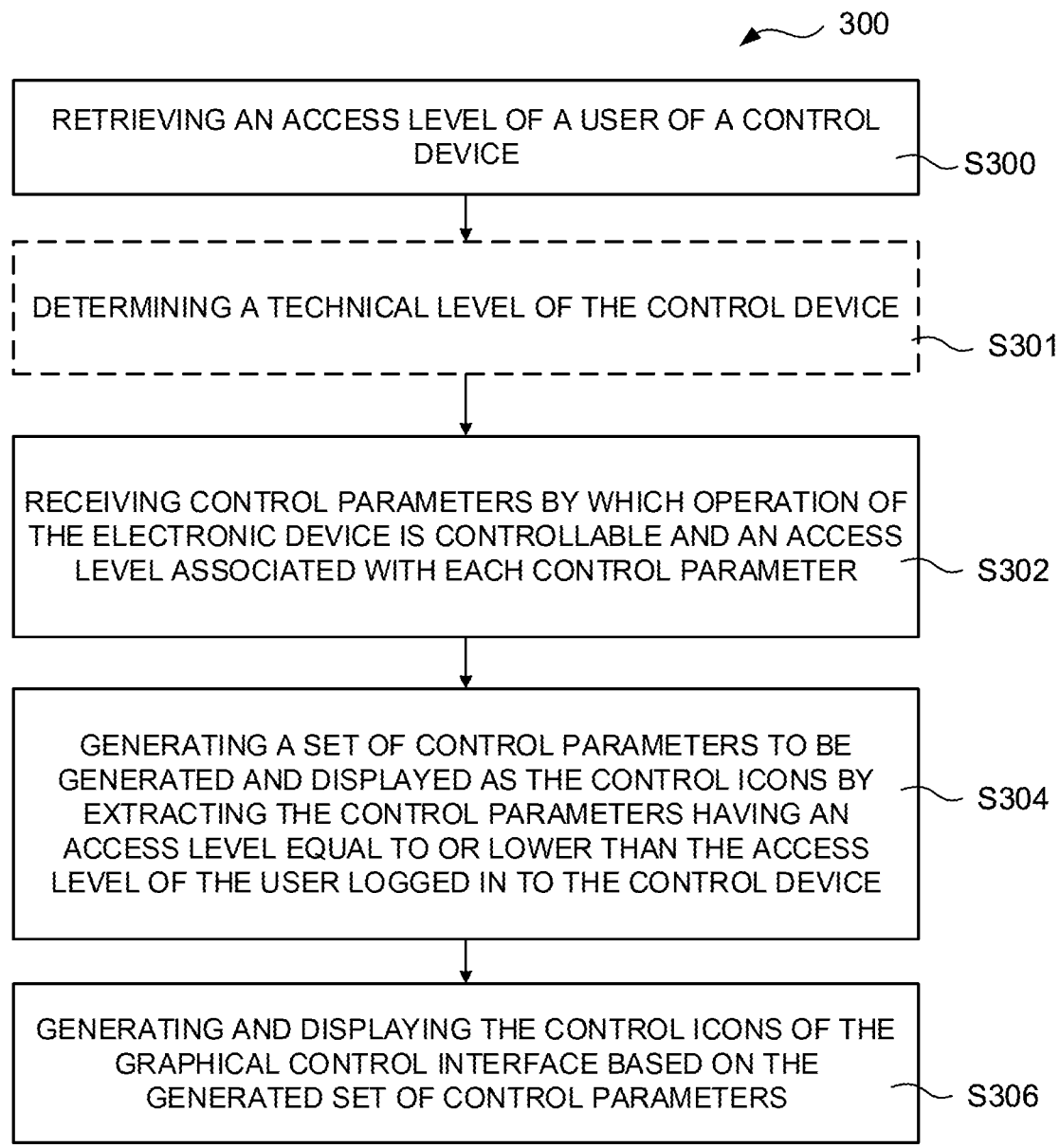

| Control parameter A | Access level 1 |
| Control parameter B | Access level 2 |
| Control parameter C | Access level 3 |
| Control parameter D | Access level 2 |
| Control parameter E | Access level 1 |
| Control parameter F | Access level 1 |
| Control parameter G | Access level 3 |
| Control parameter H | Access level 2 |

CONTROLLING DIFFERENT STATES OF OPERATION OF AN ELECTRONIC DEVICE OVER A COMMUNICATION NETWORK USING A CONTROL DEVICE

FIELD OF INVENTION

The present invention relates to controlling different states of operation of an electronic device over a communication network using a control device.

BACKGROUND

Electronic devices, such as digital network cameras connected to a communication network are used for many different applications. Examples of applications are monitoring and surveillance applications. In many applications an electronic device may be controlled over the communication network by means of a control device. The control device may for example be a device that is permanently connected to the communication network dedicated for the task of controlling the electronic device or a device that is temporarily connected to the communication network for controlling the electronic device. The control device is typically a computing device configured for running software for controlling the electronic device. In the case of the electronic device being a digital network camera the software is typically a Video Managing Software, VMS.

However, upon updating an electronic device, connected to the communication network, with new functionality or installing a new electronic device with new functionality to the communication network, the control device may not support this new functionality. Hence, there is a need for enabling support for new functionality in control devices configured to control an electronic device over a communication network.

SUMMARY

It is an object to mitigate, alleviate or eliminate one or more of the above-identified deficiencies in the art and disadvantages singly or in any combination.

According to a first aspect a method for generating and displaying a graphical control interface comprising control graphics enabling control, at a control device and over a communication network, of different states of operation and/or functions of an electronic device is provided. The method comprises retrieving, at a control device, an access level of a user logged in to the control device; receiving, at the control device and from the electronic device, control parameters by which operation of the electronic device is controllable and an access level associated with each control parameter; generating, at the control device, a set of control parameters to be generated and displayed as the control graphics by, from the received control parameters, extracting the control parameters having an access level equal to or lower than the access level of the user logged in to the control device; and generating and displaying, at the control device, the control graphics of the graphical control interface based on the generated set of control parameters.

Accordingly, the electronic device may be configured to send a list of control parameters to the control device. Each control parameter is associated with an access level needed for performing the operation of the electronic device represented by the control parameter. Then, the control device is configured to present control graphics on a display, the control graphics representing control of different states of operation and/or different functions of the electronic device. The control device is further configured to only display control graphics representing control parameters that are associated with an access level that should be accessible by a person logged in to the control device having an appropriate access level. The check for which control graphics to be displayed by the control device is made before displaying the control graphics. In this way no, or very limited, updates are needed on the control device even though new functionality of the electronic device has been added. Hence, functionality on the electronic device may be developed without needing to change the infrastructure of existing control devices. Accordingly, costs and time related to updating existing infrastructure of one or more control devices may be reduced.

The method may further comprise determining a technical ability of the control device, wherein the control parameters received at the control device further is associated with a technical requirement, and wherein the act of generating the set of control parameters further comprises extracting control parameters having a technical requirement corresponding to the technical ability of the control device. Accordingly, also, or instead, technical requirements of the control parameters need at the control device for performing the control of the electronic device may be taken into account when generating the set of control parameters to be displayed.

According to a second aspect an electronic device is provided. The electronic device comprising: a data storage comprising control parameters by which operation of the electronic device are controlled and an access level associated with each control parameter; a message generating circuitry configured to generate a control setup message comprising the control parameters and associated access levels; and a network interface configured to send the control setup message over a communication network to a control device configured to control the electronic device.

The data storage device may further comprise information of a technical requirement associated with each control parameter, and wherein the message generating circuitry is configured to generate the control setup message to further comprise the information of the technical requirement associated with each control parameter.

The electronic device may be a digital network camera, wherein the control parameters are control parameters for controlling operation of the digital network camera.

The above mentioned features of the method, when applicable, apply to this second aspect as well. In order to avoid undue repetition, reference is made to the above.

According to a third aspect a control device for controlling an electronic device over a communication network is provided. The control device comprising: an access level determining circuitry configured to determine an access level of a user logged in to the control device; a network interface configured to receive a control setup message from the electronic device over the communication network, the control setup message comprising control parameters by which operation of the electronic device are controlled and an access level associated with each control parameter; a control interface setup circuitry configured to generate a set of control parameters, to be displayed as control graphics representing different states of operation and/or controllable functions of the electronic device, by, from the in the control setup message received control parameters, extract control parameters having an access level equal to or lower than the access level of the user logged in to the control device; and a graphic generating circuitry configured to generate a graphical control interface comprising control graphics enabling control of different states of operation of the electronic device corresponding to the extracted control parameters.

The control device may further comprise a display configured to display the generated graphical control interface.

The control device may further comprise a technical ability determining circuitry configured to determine a technical ability of the control device; wherein the control setup message further comprises a technical requirement associated with each control parameter; and wherein the control interface setup circuitry is further configured to generate the set of control parameters by extracting control parameters having an access level equal to or lower than the access level of the user logged in to the control device and having technical requirement corresponding to the technical ability of the control device.

The above mentioned features of the method and electronic device, when applicable, apply to this third aspect as well. In order to avoid undue repetition, reference is made to the above.

According to a forth aspect a system is provided. The system comprising an electronic device and a control device for controlling the electronic device over a communication network, wherein the electronic device comprises: a data storage comprising control parameters by which operation of the electronic device are controlled and an access level associated with each control parameter; a message generating circuitry configured to generate a control setup message comprising the control parameters and associated access levels; and a network interface configured to send the control setup message over the communication network to the control device; wherein the control device comprises: an access level determining circuitry configured to determine an access level of a user logged in to the control device; a network interface configured to receive the control setup message from the electronic device over the communication network; a control interface setup circuitry configured to generate a set of control parameters, to be displayed as control graphics representing different states of operation of the electronic device, by, from the in the control setup message received control parameters, extract control parameters having an access level equal to or lower than the access level of the user logged in to the control device; and a graphic generating circuitry configured to generate a graphical control interface comprising control graphics enabling control of different states of operation and/or functions of the electronic device corresponding to the extracted control parameters.

The above mentioned features of the method, electronic device and control device, when applicable, apply to this fourth aspect as well. In order to avoid undue repetition, reference is made to the above.

A further scope of applicability of the present teachings will become apparent from the detailed description given below. However, it should be understood that the detailed description and specific examples, while indicating preferred embodiments, are given by way of illustration only, since various changes and modifications within the scope of the invention will become apparent to those skilled in the art from this detailed description.

Hence, it is to be understood that the teachings are not limited to the particular component parts of the device described or steps of the methods described as such device and method may vary. It is also to be understood that the terminology used herein is for purpose of describing particular embodiments only, and is not intended to be limiting.

It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWING(S)

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

FIG. 2 illustrates an example of a control setup message.

FIG. 3 is a flowchart of a method for generating and displaying a graphical control interface comprising control graphics enabling control of different states of operation of an electronic device.

Figure 4:
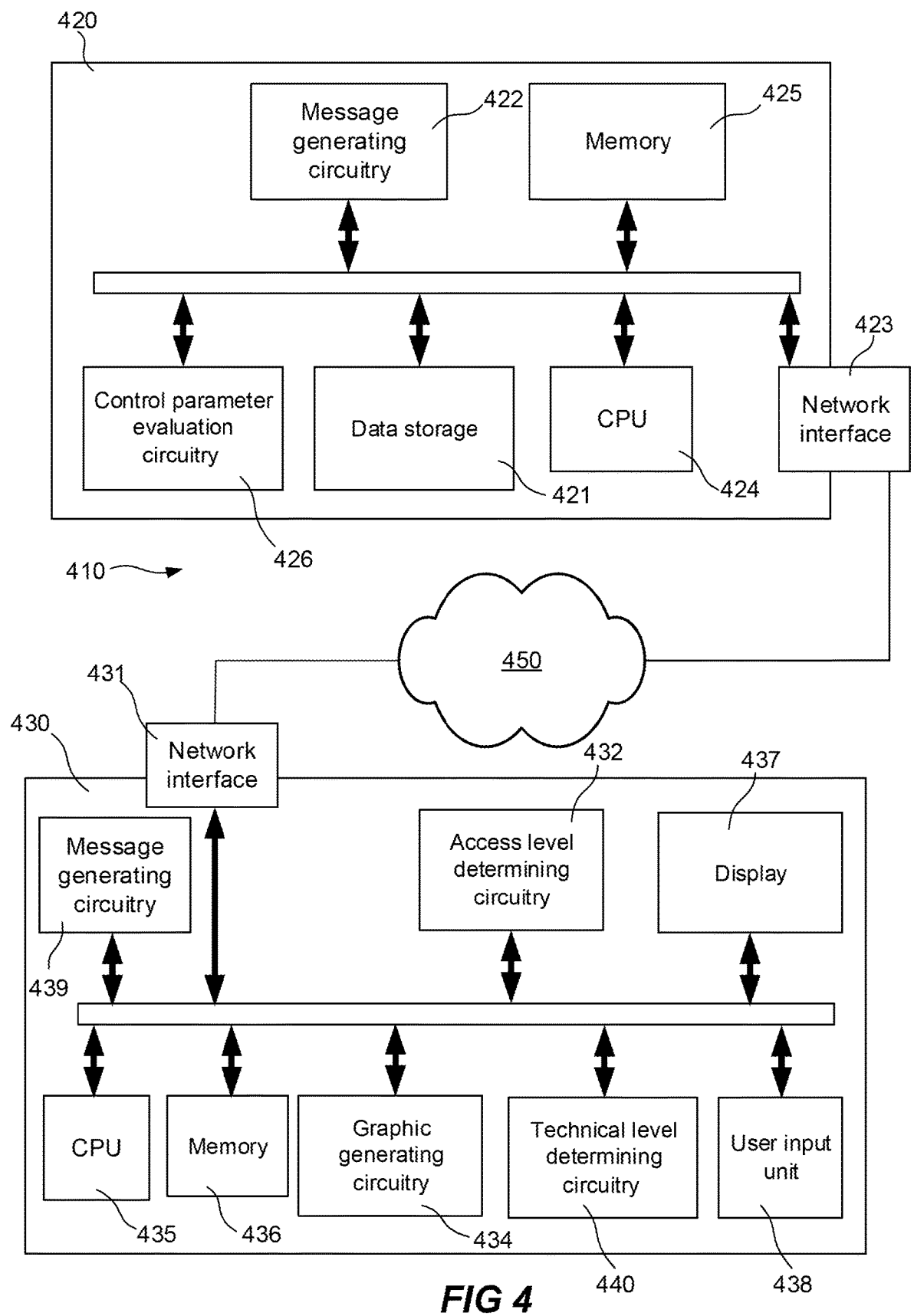

FIG. 4. illustrates an alternative system comprising an electronic device and a control device for controlling the electronic device over a communication network.

FIG. 5 illustrates an example of a control parameter database.

DETAILED DESCRIPTION OF THE PREFERRED EMBODIMENT(S)

The present system will now be described more fully hereinafter with reference to the accompanying drawings, in which currently preferred embodiments of the invention are shown. This teachings may, however, be embodied in many different forms and should not be construed as limited to the embodiments set forth herein; rather, these embodiments are provided for thoroughness and completeness, and to fully convey the scope of the invention to the skilled person.

Figure 1:
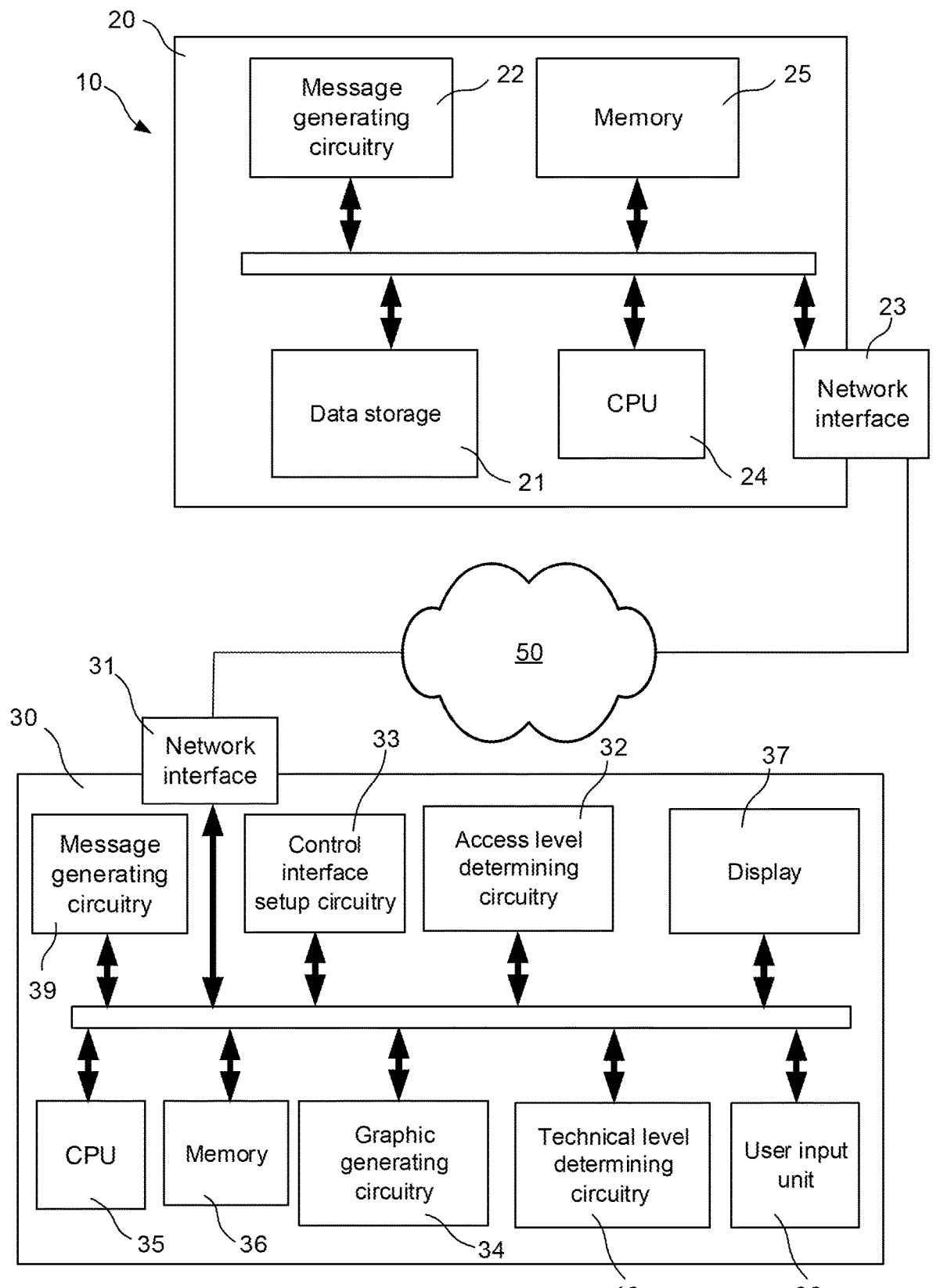
FIG. 1 illustrates a system comprising an electronic device and a control device for controlling the electronic device over a communication network.

FIG. 1 illustrates a system 10 comprising an electronic device 20 and a control device 30 connected to each other via a communication network 50. The electronic device 20 is configured to perform various operations. The control device 30 is configured to control operation(s) of the electronic device 20 over the communication network 50.

The electronic device 20 comprises a data storage 21, a message generating circuitry 22 and a network interface 23.

The data storage 21 preferably comprises one or more non-volatile memories. The data storage 21 comprises control parameter(s) by which operation of the electronic device may be controlled. The data storage 21 further comprises an access level associated with each control parameter. The control parameter(s) may be stored in a database. The database may also comprise an access level associated with each control parameter. Hence, the data storage 21 may comprise a database comprising the control parameter(s) and an access level associated with each control parameter. Each control parameter may further comprise a reference to the functionality that is activated by the activation of the control parameter.

Further, each control parameter may also be associated with a technical requirement of the control device 30. A technical requirement is a technical requirement of the control device 30 for performing the controlling of the electronic device associated with the respective control parameter. Non-limiting examples of a technical requirement are: existence of a loudspeaker, SVG support, Event System Integration, Text Display facilities.

Alternatively, the electronic device 20 may be configured to access an external database comprising the control parameter(s), an access level associated with each control parameter, and possible other data (e.g. functionality that is activated by the activation of the control parameter and/or technical requirement of the control device 30). In such alternative scenario, the system further comprises a server (not shown) comprising the database, the server being connected to the communication network 50. The electronic device 20 may hence be configured to access the database on the server via the communication network. This alternative way of accessing the control parameter(s), the access level associated with each control parameter, and possible other data from an external database of a server, is applicable to all embodiments disclosed in this disclosure.

An access level is a measure of what operations a user of a device may have access to control. For example, an administrator may have one access level pertaining to that she will have access to control all operations of a device, a user of a first type may have another access level pertaining to that she will have access to control a first sub-set of operations of a device, and a user of a second type may have another access level pertaining to that she will have access to control a second sub-set of operations of a device. As indicated by the world level the access levels are divided into levels. A user with a specific access level have access to control operations of a device having an access level equal to or lower than the access level of the user.

The electronic device 20 may be a digital network camera. In such case, the control parameters are control parameters for controlling operation of the digital network camera. Non-limiting examples of control parameters are control of: wipers, auxiluaries, analytics and camera image features. The control of the device may be performed via one or more of: HTTP URL, CGI URL, HTTP GET Request, HTTPS GET Request, HTTP Post Request, HTTPS POST Request, Webservice Request, Json Request, Mouse Cordinates, and Joystick input.

The message generating circuitry 22 is configured to generate a control setup message comprising the control parameter(s) and associated access level(s). An example of a control setup message is illustrated in FIG. 2. Hence, the control setup message comprises control parameters for the device 20 and thereto associated access levels. The message generating circuitry 22 may be implemented as a dedicated hardware circuit and/or software module. In case of being software implemented the software may be run on a CPU 24. The CPU 24 may be any suitable CPU for performing digital data processing. It shall also be noted that any dedicated hardware circuit may in part comprise software portions being run on a dedicated processor or on the CPU 24.

The message generating circuitry 22 may further be configured to generate the control setup message to further comprise the information of the technical requirement associated with each control parameter.

The electronic device 20 may further comprise a memory 25. The memory 25 may be any kind of volatile or non-volatile memory. Further, the memory 25 may comprise a plurality of memory units. At least one of the plurality of memory units may be used as a buffer memory for buffering data while processing data by the CPU 24.

The electronic device 20 is arranged to be connected to the communication network 50 via the network interface 23. The connection to the communication network may be wired or wireless. Thus, the network interface 23 may be a network port adapted to 10/100/1000 Mbps data traffic, such as an Ethernet port, a modular port being arranged to receive a modular connector, e.g., a RJ45 connector. Normally, such a RJ45 connector port is arranged to receive a network cable, such as a twisted pair cable (e.g., of cat 5, cat 5e or cat 6). Alternatively, the I/O means of the network port may be a wireless I/O means using mobile internet communication standards (e.g., 1G, 2G, 2.5G, 2.75G, 3G, 3.5G, 3.75G, 3.9G, 4G, 5G) or using WiFi.

The network interface 23 is further configured to send the control setup message over the communication network 50 to the control device 30.

The control device 30 comprises a network interface 31, an access level determining circuitry 32, a control interface setup circuitry 33 and a graphic generating circuitry 34. Any one of the access level determining circuitry 32, the control interface setup circuitry 33 and the graphic generating circuitry 34 may be implemented as a dedicated hardware circuit and/or software module. In case of being software implemented the software may be run on a CPU 35. The CPU 35 may be any suitable CPU for performing digital data processing. It shall also be noted that any dedicated hardware circuit may in part comprise software portions being run on a dedicated processor or on the CPU 35.

The control device 30 may further comprise a memory 36. The memory 36 may be any kind of volatile or non-volatile memory. Further, the memory 36 may comprise a plurality of memory units. At least one of the plurality of memory units may be used as a buffer memory for buffering data while processing data by the CPU 35.

The control device 30 is configured to be connected to the communication network 50 via the network interface 31. The connection to the communication network may be wired or wireless. Thus, the network interface 31 may be a network port adapted to 10/100/1000 Mbps data traffic, such as an Ethernet port, a modular port being arranged to receive a modular connector, e.g., a RJ45 connector. Normally, such a RJ45 connector port is arranged to receive a network cable, such as a twisted pair cable (e.g., of cat 5, cat 5e or cat 6). Alternatively, the I/O means of the network port may be a wireless I/O means using mobile internet communication standards (e.g., 1G, 2G, 2.5G, 2.75G, 3G, 3.5G, 3.75G, 3.9G, 4G, 5G) or using WiFi.

The network interface 31 is configured to receive the control setup message from the electronic device 20 over the communication network 50.

The access level determining circuitry 32 is configured to determine an access level of a user logged in to the control device 30. There are numerous techniques already known to a person skilled in the art on how to identify a user logging into a device and connecting the user to an access level, hence, these techniques will not be disclosed herein in detail.

The control interface setup circuitry 33 is configured to get the control setup message and the access level of a user logged in to the control device 30 as input data. From these input data the control interface setup circuitry 33 is configured to generate a set of control parameters by extracting control parameters having an access level equal to or lower than the access level of the user logged in to the control device 30. With reference to the exemplified control setup message of FIG. 2, below some examples of extraction of control parameters will be discussed. According to a first example, the user logged in to the control device 30 have the access level 3, i.e. the highest access level (this access level may e.g. be the access level of an administrator). According to this first example, the set of control parameters will comprise all the control parameters A-H, this since they are all associated with an access level equal to or lower than the access level (in this first example the access level 3) of the user logged in to the control device 30. According to a second example, the user logged in to the control device 30 have the access level 2, i.e. the middle access level (this access level may e.g. be the access level of an installer of the electronic device 20). According to this second example, the set of control parameters will comprise the control parameters A, B, D, E, F and H, this since these control parameters are associated with an access level equal to or lower than the access level (in this first example the access level 2) of the user logged in to the control device 30. According to a third example, the user logged in to the control device 30 have the access level 1, i.e. the lowest access level (this access level may e.g. be the access level of an operator of the electronic device 20). According to this second example, the set of control parameters will comprise the control parameters A, E and F, this since these control parameters are associated with an access level equal to or lower than the access level (in this first example the access level 1) of the user logged in to the control device 30. Hence, the set of control parameters only comprises the control parameters associated with an access level equal to or lower than the access level of the user logged in to the control device 30.

The graphic generating circuitry 34 is configured to receive the set of control parameters generated by the control interface setup circuitry 33 as input data. The graphic generating circuitry 34 is further configured to generate a graphical control interface comprising control graphics for the control parameters. The control graphics representing control of different states of operation of the electronic device 20. The different states of operation correspond to the, by the control interface setup circuitry 33, extracted control parameters. Non-limiting examples of control graphics are: a text bar; a toggle button, a menu item and a slider. Hence, control of different states of operation of the electronic device 20 corresponding to the by the control interface setup circuitry 33 extracted control parameters are enabled.

The control device 30 may further comprise a display 37 configured to display the graphical control interface.

The control device 30 may further comprise a user input unit 38 configured to receive user input indicative on activation of one or more of the control graphics of the graphical control interface. Many different user input unit 38 for this purpose are known for the person skilled in the art. Non-limiting examples are a mouse, a keyboard, and a touch sensitive display.

The control device 30 may further comprise a message generating circuitry 39. The message generating circuitry 39 may be implemented as a dedicated hardware circuit and/or software module. In case of being software implemented the software may be run on the CPU 35. The message generating circuitry 39 is configured to generate a command message. The message generating circuitry 39 is configured to generate the command message, in case of activation of a control graphics. The command message including a reference to what operation of the electronic device 20 that has been controlled by activation of the control graphics. The network interface 31 is then further configured to send the command message to the electronic device 20 over the communication network 50.

The control device 30 may further comprise a technical ability determining circuitry 40. The technical ability determining circuitry 40 may be implemented as a dedicated hardware circuit and/or software module. In case of being software implemented the software may be run on the CPU 35. The technical ability determining circuitry 40 is configured to determine a technical ability of the control device 30. The technical ability of the control device 30 is a measure of technical features the control device 30 may perform. Non-limiting examples are that the control device 30 may display PopUP, display text and/or open an audio channel to device.

As discussed above, the control setup message may further comprise a technical requirement associated with each control parameter. The control interface setup circuitry 33 may then further be configured to generate the set of control parameters by extracting control parameters having an access level equal to or lower than the access level of the user logged in to the control device and having technical requirement corresponding to the technical ability of the control device 30. According to a non-limiting example, in the technical ability it may be expressed that the control device 30 does not comprises a loudspeaker. Hence, if no loudspeaker is present at the control device 30, control graphics regarding receipt of audio at the control device may not be generated and displayed.

Accordingly, the electronic device 20 is configured to send a list of control parameters to the control device 30. Each control parameter is associated with an access level needed for performing the operation of the electronic device 20 represented by the control parameter. Then, the control device 30 is configured to present control graphics on a display, the control graphics representing control of different states of operation of the electronic device 20. The control device 30 is further configured to only display control graphics representing control parameters that are associated with an access level that should be accessible by a person logged in to the control device 30 having an appropriate access level. The check for which control graphics to be displayed by the control device 30 is made before displaying the control graphics. The control device 30 is further configured to, in case of activation of a control graphics, send a command message back to the electronic device 20. The command message is sent over the communication network 50. The command message including a reference to what operation of the electronic device 20 that has been controlled by activation of the control graphics. In this way no updates are needed on the control device 30 even though new functionality of the electronic device 20 has been added.

With reference to FIG. 3 a method 300 for generating and displaying a graphical control interface comprising control graphics enabling control of different states of operation of an electronic device 20 will be discussed. The generating and displaying is performed at a control device 30. The control device 30 is configured to control the electronic device 20 over a communication network 50. The method comprising the following acts. Retrieving S300, at the control device 30, an access level of a user logged in to the control device 30. Receiving S302, at the control device 30 and from the electronic device 20, control parameters by which operation of the electronic device 20 is controllable and an access level associated with each control parameter. Generating S304, at the control device 30, a set of control parameters to be generated and displayed as the control graphics by, from the received control parameters, extracting the control parameters having an access level equal to or lower than the access level of the user logged in to the control device 30. Generating and displaying S306, at the control device 30, the control graphics of the graphical control interface based on the generated set of control parameters.

The method may further comprise determining S301 a technical ability of the control device 30. The control parameters received at the control device 30 may further be associated with a technical requirement. The act of generating S304 the set of control parameters may further comprise extracting control parameters having a technical requirement corresponding to the technical ability of the control device 30.

According to alternative embodiments the extraction of the set of control parameters may be performed in the electronic device 20. Examples of such embodiments will now be discussed in connection with FIG. 4 showing an alternative system 410. Also this alternative system 410 comprises an electronic device 420 and a control device 430 connected to each other via a communication network 450. The electronic device 420 is configured to perform various operations. The control device 430 is configured to control operation(s) of the electronic device 420 over the communication network 450.

The control device 430 comprises a network interface 43, an access level determining circuitry 432 and a message generating circuitry 439.

The control device 430 is configured to be connected to the communication network 450 via the network interface 431. The connection to the communication network may be wired or wireless. Thus, the network interface 431 may be a network port adapted to 10/100/1000 Mbps data traffic, such as an Ethernet port, a modular port being arranged to receive a modular connector, e.g., a RJ45 connector. Normally, such a RJ45 connector port is arranged to receive a network cable, such as a twisted pair cable (e.g., of cat 5, cat 5e or cat 6). Alternatively, the I/O means of the network port may be a wireless I/O means using mobile internet communication standards (e.g., 1G, 2G, 2.5G, 2.75G, 3G, 3.5G, 3.75G, 3.9G, 4G, 5G) or using WiFi.

Any one of the access level determining circuitry 432 and the message generating circuitry 439 may be implemented as a dedicated hardware circuit and/or software module. In case of being software implemented the software may be run on a CPU 435. The CPU 435 may be any suitable CPU for performing digital data processing. It shall also be noted that any dedicated hardware circuit may in part comprise software portions being run on a dedicated processor or on the CPU 435.

The control device 430 may further comprise a memory 436. The memory 436 may be any kind of volatile or non-volatile memory. Further, the memory 436 may comprise a plurality of memory units. At least one of the plurality of memory units may be used as a buffer memory for buffering data while processing data by the CPU 435.

The access level determining circuitry 432 is configured to determine an access level of a user logged in to the control device 430. An access level is a measure of what operations a user of a device may have access to control. See above, for a more detailed discussion about access level(s). There are numerous techniques already known to a person skilled in the art on how to identify a user logging into a device and connecting the user to an access level, hence, these techniques will not be disclosed herein in detail.

The message generating circuitry 439 is configured to generate an access level message. The access level message comprising the access level of the user logged in to the control device 430.

The network interface 431 of the control device 430 is configured to send the access level message to the electronic device 420 over the communication network 450.

The electronic device 420 comprises a data storage 421, a message generating circuitry 422, a network interface 423 and a control parameter evaluation circuitry 426.

Any one of the message generating circuitry 422 and the control parameter evaluation circuitry 426 may be implemented as a dedicated hardware circuit and/or software module. In case of being software implemented the software may be run on a CPU 424. The CPU 424 may be any suitable CPU for performing digital data processing. It shall also be noted that any dedicated hardware circuit may in part comprise software portions being run on a dedicated processor or on the CPU 424.

The electric device 420 may further comprise a memory 425. The memory 425 may be any kind of volatile or non-volatile memory. Further, the memory 425 may comprise a plurality of memory units. At least one of the plurality of memory units may be used as a buffer memory for buffering data while processing data by the CPU 424.

The electronic device 420 is arranged to be connected to the communication network 450 via the network interface 423. The connection to the communication network may be wired or wireless. Thus, the network interface 423 may be a network port adapted to 10/100/1000 Mbps data traffic, such as an Ethernet port, a modular port being arranged to receive a modular connector, e.g., a RJ45 connector. Normally, such a RJ45 connector port is arranged to receive a network cable, such as a twisted pair cable (e.g., of cat 5, cat 5e or cat 6). Alternatively, the I/O means of the network port may be a wireless I/O means using mobile internet communication standards (e.g., 1G, 2G, 2.5G, 2.75G, 3G, 3.5G, 3.75G, 3.9G, 4G, 5G) or using WiFi.

The network interface 423 of the electronic device 420 is configured to receive the access level message from the control device 430 over the communication network 450.

The data storage 421 preferably comprises one or more non-volatile memories. The data storage 421 comprises control parameter(s) by which operation of the electronic device may be controlled. The data storage 421 further comprises and an access level associated with each control parameter. The control parameter(s) may be stored in a database. The database may also comprise an access level associated with each control parameter. Hence, the data storage 421 may comprise a database comprising the control parameter(s) and an access level associated with each control parameter. Each control parameter may further comprise a reference to the functionality that is activated by the activation of the control parameter.

Further, each control parameter may also be associated with a technical requirement of the control device 430. A technical requirement is a technical requirement of the control device 430 for performing the controlling of the electronic device associated with the respective control parameter. Non-limiting examples of a technical requirement are: existence of a loudspeaker, SVG support, Event System Integration, Text Display facilities.

Alternatively, the electronic device 420 may be configured to access an external database comprising the control parameter(s), an access level associated with each control parameter, and possible other data (e.g. functionality that is activated by the activation of the control parameter and/or technical requirement of the control device 430). In such alternative scenario, the system further comprises a server (not shown) comprising the database, the server being connected to the communication network 450. The electronic device 420 may hence be configured to access the database on the server via the communication network. This alternative way of accessing the control parameter(s), the access level associated with each control parameter, and possible other data from an external database of a server, is applicable to all embodiments disclosed in this disclosure.

The electronic device 420 may be a digital network camera. In such case, the control parameters are control parameters for controlling operation of the digital network camera.

The control parameter evaluation circuitry 426 is configured to use the access level of the user logged in to the control device of the access level message as input data. The control parameter evaluation circuitry 426 is configured to, from the database, extract the control parameters having an access level equal to or lower than the access level of the user logged in to the control device 430. The extracted control parameters having an access level equal to or lower than the access level of the user logged in to the control device 430 forms a set of control parameters. With reference to the exemplified database of control parameters and the access level associated with each control parameter of FIG. 5, below some examples of extraction of control parameters will be discussed. According to a first example, the user logged in to the control device 430 have the access level 3, i.e. the highest access level (this access level may e.g. be the access level of an administrator). According to this first example, the set of control parameters will comprise all the control parameters A-H, this since they are all associated with an access level equal to or lower than the access level (in this first example the access level 3) of the user logged in to the control device 430. According to a second example, the user logged in to the control device 430 have the access level 2, i.e. the middle access level (this access level may e.g. be the access level of an installer of the electronic device 420). According to this second example, the set of control parameters will comprise the control parameters A, B, D, E, F and H, this since these control parameters are associated with an access level equal to or lower than the access level (in this first example the access level 2) of the user logged in to the control device 30. According to a third example, the user logged in to the control device 30 have the access level 1, i.e. the lowest access level (this access level may e.g. be the access level of an operator of the electronic device 420). According to this second example, the set of control parameters will comprise the control parameters A, E and F, this since these control parameters are associated with an access level equal to or lower than the access level (in this first example the access level 1) of the user logged in to the control device 430. Hence, the set of control parameters only comprises the control parameters associated with an access level equal to or lower than the access level of the user logged in to the control device 430.

The message generating circuitry 422 of the electronic device 420 is configured to generate a control setup message. The control setup message comprising the extracted set of control parameters. Optionally, the control setup message may comprise a reference to the functionality that is activated by the activation of each of the control parameters in the set of control parameters.

The network interface 423 of the electronic device 420 is further configured to send the control setup message to the control device 430 over the communication network 450.

The network interface 431 of the control device 430 is further configured to receive the control setup message from the electronic device 420 over the communication network 450.

The control device 430 further comprises a graphic generating circuitry 434. The graphic generating circuitry 434 may be implemented as a dedicated hardware circuit and/or software module. In case of being software implemented the software may be run on a CPU 435. The graphic generating circuitry 434 is configured to receive the set of control parameters of the control setup message as input data. The graphic generating circuitry 434 is further configured to generate a graphical control interface comprising control graphics for the control parameters of the set of control parameters. The control graphics representing control of different states of operation of the electronic device 420 corresponding to the extracted set of control parameters. Hence, control of different states of operation of the electronic device 420 corresponding to the extracted set of control parameters are enabled.

The control device 430 may further comprise a display 437 configured to display the graphical control interface.

The control device 30 may further comprise a user input unit 438 configured to receive user input indicative on activation of one or more of the control graphics of the graphical control interface. Many different user input unit 438 for this purpose are known for the person skilled in the art. Non-limiting examples are a mouse, a keyboard, and a touch sensitive display.

The message generating circuitry 439 of the control device 430 may further be configured to generate a command message. The message generating circuitry 439 is configured to generate the command message, in case of activation of a control graphics. The command message including a reference to what operation of the electronic device 420 that has been controlled by activation of the control graphics. The network interface 431 of the control device 430 is then further configured to send the command message to the electronic device 420 over the communication network 450.

As described above, the database of control parameters may further comprise a technical requirement associated with each control parameter. The control device 430 may further comprise a technical ability determining circuitry 440. The technical ability determining circuitry 440 may be implemented as a dedicated hardware circuit and/or software module. In case of being software implemented the software may be run on the CPU 435. The technical ability determining circuitry 440 is configured to determine a technical ability of the control device 430. The technical ability of the control device 430 is a measure of technical features the control device 30 may perform. Non-limiting examples are that the control device 30 may display PopUP, display text and/or open an audio channel to device.

The message generating circuitry 439 of the control device 430 may further be configured to generate a technical ability message. The technical ability message comprising the technical ability of the control device 430. The technical ability message may be included in the access level message.

The control parameter evaluation circuitry 426 of the electronic device 420 may then further be configured to generate the set of control parameters by in addition to extracting control parameters having an access level equal to or lower than the access level of the user logged in to the control device also taking the technical requirement of the control parameters and the technical ability of the control device 30 into consideration. The control parameter evaluation circuitry 426 may be configured to generate the set of control parameters by extracting control parameters having an access level equal to or lower than the access level of the user logged in to the control device 430 and having technical requirement corresponding to the technical ability of the control device 430. According to a non-limiting example, in the technical ability it may be expressed that the control device 430 does not comprises a loudspeaker. Hence, if no loudspeaker is present at the control device 430, control graphics regarding receipt of audio at the control device 430 shall not be generated and hence control parameters needing a loudspeaker will not be extracted by the control parameter evaluation circuitry 426.

Hence, the extraction of the set of control parameters may be performed in the electronic device 420. In such cases the access level of the user logged in to the control device 430 is received at the electronic device 420 and the act of generating the set of control parameters is performed at the electronic device 430. Further, the generated set of control parameters are sent from the electronic device 420 to the control device 430 over the communication network 450. In this way no updates are needed on the control device 430 even though new functionality of the electronic device 420 has been added.

The person skilled in the art realizes that the present teachings are by no means limited to the preferred embodiments described above. On the contrary, many modifications and variations are possible within the scope of the appended claims.

For example, the generation of the set of control parameters to be displayed as the control graphics of the graphical control interface may instead be solely based on the technical ability of the control device and the technical requirements of respective control parameter. Hence, the set of control parameters, to be displayed as control graphics representing different states of operation of the electronic device, may be determined by extracting control parameters having technical requirement corresponding to the technical ability of the control device.

Additionally, variations to the disclosed embodiments can be understood and effected by the skilled person in practicing the claimed invention, from a study of the drawings, the disclosure, and the appended claims.

What is claimed is:

1. A method for generating and displaying, at a control device, a graphical control interface comprising control graphics that enable a user to control one or more control parameters of an electronic device, the method comprising:
   retrieving, at the control device, an access level of a user logged in to the control device;
   receiving, at the control device from the electronic device, a control setup message comprising one or more control parameters by which one or more functions of the electronic device are controlled, each control parameter being associated with an access level, wherein the one or more control parameters and the access level associated with each control parameter are stored on the electronic device;
   generating, at the control device, a set of control parameters based on the received control setup message and the access level of the user logged in to the control device, wherein the generated set of control parameters are generated by extracting, from the control setup message, the control parameters having an access level equal to or lower than the access level of the user logged in to the control device; and
   generating and displaying, at the control device, the graphical control interface comprising the control graphics that enable the user to control the one or more control parameters of the electronic device based on the generated set of control parameters.

2. The method according to claim 1, further comprising determining a technical ability of the control device,
   wherein the control parameters received at the control device are further associated with a technical requirement, and
   wherein the act of generating the set of control parameters further comprises extracting control parameters having a technical requirement corresponding to the technical ability of the control device.

3. The method according to claim 1, wherein the one or more control parameters include any one or a combination of wipers, auxiliaries, analytics, and camera image features.

4. An electronic device comprising:
   a data storage comprising one or more control parameters by which one or more functions of the electronic device are controlled and each control parameter is associated with an access level;
   a message generating circuitry configured to generate a control setup message comprising the one or more control parameters and an access level associated with each control parameter; and
   a network interface configured to send the control setup message over a communication network to a control device configured to control the electronic device, wherein the control setup message and an access level of a user logged in to the control device are used by the control device to generate a set of control parameters, wherein the set of control parameters are generated by extracting, from the control setup message, the control parameters having an access level equal to or lower than the access level of the user logged in to the control device; and
   receive a command message over the communication network from the control device, wherein the command message controls one or more control parameters of the electronic device based on the generated set of control parameters, wherein the command message is sent from the control device in response to user input on a graphical control interface of the control device from the user logged in to the control device.

5. The electronic device according to claim 4, wherein the data storage further comprises information of a technical requirement associated with each control parameter, and wherein the message generating circuitry is configured to generate the control setup message to further comprise the information of the technical requirement associated with each control parameter.

6. The electronic device according to claim 4, wherein the electronic device is a digital network camera and wherein the control parameters are control parameters for controlling operation of the digital network camera.

7. The electronic device according to claim 5, wherein the electronic device is a digital network camera and wherein the control parameters are control parameters for controlling operation of the digital network camera.

8. The electronic device according to claim 4, wherein the one or more control parameters include any one or a combination of wipers, auxiliaries, analytics, and camera image features.

9. A control device for controlling an electronic device over a communication network, the control device comprising:

an access level determining circuitry configured to determine an access level of a user logged in to the control device;

a network interface configured to receive a control setup message from the electronic device over the communication network, the control setup message comprising one or more control parameters by which one or more functions of the electronic device are controlled, each control parameter being associated with an access level, wherein the one or more control parameters and the access level associated with each control parameter are stored on the electronic device;

a control interface setup circuitry configured to generate a set of control parameters based on the received control setup message and the access level of the user logged in to the control device, wherein the generated set of control parameters are generated by extracting, from the control setup message, control parameters having an access level equal to or lower than the access level of the user logged in to the control device; and a graphic generating circuitry configured to generate a graphical control interface comprising control graphics that enable the user to control the one or more control parameters of the electronic device based on the generated set of control parameters.

10. The control device according to claim 9, further comprising a display configured to display the generated graphical control interface.

11. The control device according to claim 9, further comprising:

a technical ability determining circuitry configured to determine a technical ability of the control device;

wherein the control setup message further comprises a technical requirement associated with each control parameter; and wherein the control interface setup circuitry is further configured to generate the set of control parameters by extracting control parameters having an access level equal to or lower than the access level of the user logged in to the control device and having technical requirement corresponding to the technical ability of the control device.

12. The control device according to claim 10, further comprising:

a technical ability determining circuitry configured to determine a technical ability of the control device;

wherein the control setup message further comprises a technical requirement associated with each control parameter; and wherein the control interface setup circuitry is further configured to generate the set of control parameters by extracting control parameters having an access level equal to or lower than the access level of the user logged in to the control device and having technical requirement corresponding to the technical ability of the control device.

13. The control device according to claim 9, wherein the one or more control parameters include any one or a combination of wipers, auxiliaries, analytics, and camera image features.

14. A system comprising an electronic device and a control device, wherein the electronic device comprises:
a data storage comprising one or more control parameters by which one or more functions of the electronic device are controlled, each control parameter being associated with and an access level;

a message generating circuitry configured to generate a control setup message comprising the one or more control parameters and the access level associated with each control parameter; and a network interface configured to send the control setup message over a communication network to the control device;

wherein the control device comprises:
an access level determining circuitry configured to determine an access level of a user logged in to the control device;

a network interface configured to receive the control setup message from the electronic device over the communication network;

a control interface setup circuitry configured to generate a set of control parameters based on the received control setup message and the access level of the user logged in to the control device, wherein the generated set of control parameters are generated by extracting, from the control setup message, control parameters having an access level equal to or lower than the access level of the user logged in to the control device; and a graphic generating circuitry configured to generate a graphical control interface comprising control graphics that enable the user to control the one or more control parameters of the electronic device based on the generated set of control parameters.

15. The system according to claim 14, wherein the one or more control parameters include any one or a combination of wipers, auxiliaries, analytics, and camera image features.

* * * * *